(12) United States Patent
Jordan

(10) Patent No.: US 7,386,008 B2
(45) Date of Patent: Jun. 10, 2008

(54) METHOD AND APPARATUS FOR CONVERTING DATA PACKETS BETWEEN A HIGHER BANDWIDTH NETWORK AND A LOWER BANDWIDTH NETWORK HAVING MULTIPLE CHANNELS

(75) Inventor: Reuven D. Jordan, Petah Tikra (IL)

(73) Assignee: ECI Telecom Ltd., Petach-Tikva (IL)

( * ) Notice: Subject to any disclaimer, the term of this patent is extended or adjusted under 35 U.S.C. 154(b) by 1213 days.

(21) Appl. No.: 10/139,398

(22) Filed: May 7, 2002

(65) Prior Publication Data

US 2003/0016697 A1  Jan. 23, 2003

(51) Int. Cl.
*H04J 3/22* (2006.01)

(52) U.S. Cl. .............. 370/466; 370/505; 370/517; 370/907

(58) Field of Classification Search ........ 370/466, 370/467
See application file for complete search history.

(56) References Cited

U.S. PATENT DOCUMENTS

| | | | |
|---|---|---|---|
| 5,189,411 A * | 2/1993 | Collar et al. ............. 340/825.2 |
| 5,293,378 A | 3/1994 | Shimizu | |
| 5,544,161 A | 8/1996 | Bigham et al. | |
| 5,568,486 A | 10/1996 | Huscroft et al. ............ 370/94.2 |
| 5,570,356 A | 10/1996 | Finney et al. | |
| 5,680,400 A | 10/1997 | York | |
| 5,970,067 A | 10/1999 | Sathe et al. | |
| 6,034,974 A | 3/2000 | Matsuoka et al. | |
| 6,076,115 A * | 6/2000 | Sambamurthy et al. ..... 709/250 |
| 6,081,523 A | 6/2000 | Merchant et al. | |
| 6,094,439 A * | 7/2000 | Krishna et al. ............. 370/445 |
| 6,111,897 A | 8/2000 | Moon | |
| 6,148,010 A | 11/2000 | Sutton et al. | |
| 6,643,719 B1 * | 11/2003 | Baker ........................... 710/57 |
| 6,937,624 B1 * | 8/2005 | Gavin ........................ 370/528 |
| 7,031,341 B2 * | 4/2006 | Yu .............................. 370/469 |
| 2003/0016690 A1 | 1/2003 | Jordan ....................... 370/433 |
| 2003/0016697 A1 | 1/2003 | Jordan ....................... 370/466 |

FOREIGN PATENT DOCUMENTS

| | | | |
|---|---|---|---|
| EP | 1 091 513 A | 4/2001 |
| EP | 1 124 355 A2 | 8/2001 |
| WO | WO 01 08356 A | 2/2001 |

* cited by examiner

*Primary Examiner*—Hassan Kizou
*Assistant Examiner*—Bo Zhu
(74) *Attorney, Agent, or Firm*—Harold L. Novick; Stanley N. Protigal; The Nath Law Group

(57) ABSTRACT

A method and apparatus for converting packetized data received from a broadband network to a multi-channel payload network having a narrower bandwidth is disclosed. The method includes converting a packet received from the broadband network to a serial stream having first and second pluralities of bytes, the second plurality of bytes being idle; removing the idle bytes from the serial stream thereby providing a reduced data; demultiplexing sequentially occurring reduced data across plural channels of a narrower bandwidth payload network and converting each channels reduced data to corresponding second packets of the payload network. The method also includes receiving the respective second packets from the respective channels of the payload network; converting the packets to corresponding serial data streams and multiplexing the streams to restore an original sequence; inserting substitute idle bytes in substitution of the idle bytes removed from the first serial stream thereby providing a restored data; and converting the multiplexed and restored data to a third packet of the broadband network.

31 Claims, 2 Drawing Sheets

US 7,386,008 B2

METHOD AND APPARATUS FOR CONVERTING DATA PACKETS BETWEEN A HIGHER BANDWIDTH NETWORK AND A LOWER BANDWIDTH NETWORK HAVING MULTIPLE CHANNELS

RELATED APPLICATION

This application is related to an application entitled Method and Apparatus for Converting Data Packets between a Higher Bandwidth Network and a Lower Bandwidth Network by the same inventor and filed the same day as this application, said application being incorporated in its entirety herein by reference.

FIELD OF THE INVENTION

This invention relates, in general, to a method and apparatus for converting a data packet for transmission and reception in a communications network, and in particular to a method and apparatus for converting a data packet received from a first broadband telecommunications network to a second data packet configured for transmission on a payload network having multiple channels, each channel having a narrower bandwidth than the first broadband network; and, after transmission on the payload network, reconverting the second data packets back to a format of the first broadband network. In a particular embodiment, this invention relates to a method and apparatus for converting a data packet received from a 1 Gb Ethernet network to a format for transmission on an OCnc (n=1, 3, 12) payload network having two channels; and for re-converting the transmitted OCnc data packets back to a format of the 1 Gb Ethernet data packet.

The instant application is more particularly directed to a method and apparatus wherein the OCnc payload network has a plurality of parallel channels comprising a primary high priority channel and at least one secondary, lower priority channel. In contrast, Applicant's related application entitled Method and Apparatus for Converting Data Packets between a Higher Bandwidth Network and a Lower Bandwidth Network is directed to a method and apparatus wherein the OCnc payload network has only a single channel.

BACKGROUND OF THE INVENTION

Ethernet is basically a broadcast protocol. Its main advantage is its simplicity. This allows Ethernet to be implemented with less costly hardware and software. Ethernet has become a common protocol for local area networks. For purposes of this application, the term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-Mb Ethernet, known as "StarLAN", 10-Mb Ethernet, 100-Mb Ethernet, known as "Fast Ethernet", 1-Gb Ethernet and any future CSMA/CD protocols at any other data rates.

Ethernet, as with other network protocols, transmits data across a packet switched network. In packet switched networks data is divided into small pieces called packets that are multiplexed onto high capacity inter-machine connections. Packet switching is used by virtually all computer interconnections because of its efficiency in data transmissions. Packet switched networks use bandwidth on a circuit as needed, allowing other transmissions to pass through the lines in the interim.

A packet is a block of data together with appropriate identification information necessary for routing and delivery to its destination. The packet includes a source address, a destination address, the data being transmitted, and a series of data integrity bits commonly referred to as a cyclical redundancy check or CRC. The source address identifies a device that originated the packet and the destination address identifies a device to which the packet is to be transmitted over the network.

As is known in the art, transmission of a data packet on a packet switched network results in a transmission burst which entails synchronously transmitting all bytes which make up the data packet.

In simple point-to-point networks having only an origin node and a destination node, idle bytes can be inserted between packets. In more complex multi-node networks, a link between nodes "i" and "j" is frequently left silent when there is nothing to be transmitted from node "i" to node "j".

A data packet being transmitted on a 1 Gb Ethernet network has a capacity of a certain maximum number of bytes corresponding to the network bandwidth capacity, but usually a fewer number of bytes are transmitted.

An Ethernet packet size typically ranges from 40 to about 1500 bytes. A transmission rate of data communicated on the 1 Gb Ethernet network is typically less than about 600 Mbps; and is frequently not delay sensitive. Moreover, 1 Gb Ethernet packet transmissions are generally "bursty"—that is, they comprise a series of short, high density bursts with idle bytes or silent periods dispersed between the bursts.

A main drawback with conventional Ethernet is that there are significant limitations on the physical distance that the network can cover. Gigabyte Ethernet networks as with other forms of Ethernet are typically found in relatively short distance Local Area Networks (LANs) and Metropolitan Area Networks (MANs).

Long distance networks such as Wide Area Networks (WANs) frequently comprise Switched Optical Networks (SONETs) and frequently utilize conventional communications protocols such as OC12, OC3, or OC1, hereinafter collectively referred to as OCnc. In SONETs there is no particular packet size requirement.

Where it is desired to communicate the Ethernet data packet from the LAN or MAN in a first location across the long distance network to the LAN or MAN in a second location, it is necessary to convert the Ethernet packet to a format suitable for transmission across the long distance network. Encapsulation protocols have been developed to allow Ethernet packets to be transmitted over longer distances. In such protocols, the entire Ethernet packet is placed within another type of packet which has its own header and includes additional addressing information, protocol information, etc., and which conforms to a format of the long distance network. Thus, in encapsulation techniques a size of an encapsulating packet must be larger than a size of an encapsulated packet. Currently known OC12 SONET/WAN systems have a bandwidth capacity of about 622 Mbps. On the other hand, 1 Gb Ethernet packets are, by definition, one gigabyte. Thus, in order to communicate a 1 Gb Ethernet packet on an OC12 network a technique other than data encapsulation is required.

The prior art includes many attempts to solve the problem of transmitting a large packet through an intervening smaller packet carrying network having multiple channels. This prior art includes the following U.S. patents.

U.S. Pat. No. 6,148,010 to Sutton et al., incorporated herein in its entirety by reference, discloses a method and apparatus for distributing and consolidating data packets onto multiple network interfaces using frame-based inverse multiplexing to parse high speed data into frames for placement onto lower speed networks.

U.S. Pat. No. 6,111,897 to Moon, incorporated herein in its entirety by reference, discloses a multiplexing/demultiplexing apparatus in a digital communication system with a variable frame structure and a method of controlling the same. The apparatus comprises a first FIFO unit for buffering data inputted at a fixed speed, a first write controller for outputting a first write address to the first FIFO unit in response to a first data input clock, a first read controller for outputting a first read address to the first FIFO unit in response to a first data output clock, a stuff/delete determination unit for generating stuff and delete indication signals, a multiplexer for multiplexing output data from the first FIFO unit to output frame data, a demultiplexer for demultiplexing the frame data from the multiplexer, a second write controller for generating a second write address in response to a write enable signal from the demultiplexer and a second data output clock, second read controller for generating a second read address in response to a second data input clock, a clock adjustment unit for outputting the second data input clock to the second read controller, and a second FIFO unit for storing output data from the demultiplexer in response to the second write address from the second write controller and outputting the stored data in response to the second read address from the second read controller.

U.S. Pat. Nos. 6,094,439 and 6,081,523 to Krishna et al., incorporated herein in their entirety by reference, disclose a Gigabit network node having a media access controller outputting packet data at Gigabit rates using multiple 100 MB/s physical layer links coupled to a physical interface having a data router to enable implementation of a Gigabit network using low cost data links. At least a portion of the packet data is selectively transmitted in a modified reconciliation layer onto the plurality of physical layer links.

U.S. Pat. No. 6,034,974 to Matsuoka et al., incorporated herein in its entirety by reference, discloses a channel-selection-type demultiplexing circuit capable of demultiplexing signals to a desired output port during bit demultiplexing, instead of simply demultiplexing the bits as in conventional devices; and which performs bit demultiplexing based on a frequency division clock after selecting the bit signals to be demultiplexed to the desired output port from the N-channel multiplexed signal stream based on channel selection information.

U.S. Pat. No. 5,970,067 to Sathe et al., incorporated herein in its entirety by reference, discloses an asynchronous transfer mode (ATM) inverse multiplexed communication system wherein a series of communication cells are multiplexed over a set of communication links. Each communication cell includes a framing bit of a predetermined framing bit stream for each communication link and a control channel bit of a control message for each communication link. Inbound communication cells from each communication link are aligned according to the corresponding framing bit stream. The control message specifies an ordered list of logical identifiers to indicate a multiplexed sequence of transfer of the communication cells over the communication links.

U.S. Pat. No. 5,680,400 to York, incorporated herein in its entirety by reference, discloses a high speed data transfer mechanism for transferring files from a transmission host across a data link to a receiver host. An input data stream is split into N separate substreams by packaging data into packets, which may be of different sizes. As data is packetized, each packet is sent and presented to a separate data transmitter. Data is sent to the array of transmitter in round-robin fashion such that the data is first presented to the first transmitter, then to the second transmitter, and so on until each transmitter has been sent a packet, then the first transmitter is sent another, and so on, until all data packets have been sent to a transmitter. A receiving side of the mechanism then initializes as many receivers as needed, or as many data receive substreams as are required using as many receivers as are available. A substream reassembly unit reassembles data packets into a final output stream.

U.S. Pat. No. 5,570,356 to Finney et al., incorporated herein in its entirety by reference, discloses a data communication system includes a phase splitting circuit to split a high speed parallel data word into a number of individual parallel data bytes, a byte multiplexor for each of the phases of a phase splitting circuit, encoding and serialization circuits for converting each byte to an encoded form suitable for serial transmission, transmitting each encoded byte across one of a number of serial transmission links to a receiving device where the data is deserialized and decoded to recover the original byte which is then synchronized by a byte synchronization circuit. The byte synchronization circuits are then coupled to a word synchronization circuit where the original high bandwidth data word is recovered and transmitted on an internal high speed parallel bus within the receiving device.

U.S. Pat. No. 5,544,161 to Bigham et al., incorporated herein in its entirety by reference, discloses a network having an architecture that distributes services over a greater serving area. A broadcast consolidation section receives broadband data from a plurality of information providers. The broadcast consolidation section combines the data streams from different information providers and outputs a consolidated signal onto a transport ring. The broadcast ring supplies the consolidated broadcast edit to a plurality of network hubs, each of which downloads the consolidated broadcast data, converts the data and transmits it by optical fiber to a plurality of local access nodes. Each local access node combines data with downstream traffic supplied by a backbone subnetwork. The combined signals are output from the local access nodes. Demultiplexers in the network hubs and the local access nodes perform processing on received data streams, assign identification values, and output on broadband channels or narrowband channels.

U.S. Pat. No. 5,293,378 to Shimizu, incorporated herein in its entirety by reference, discloses a packet transmission system wherein a packet can be transmitted at a high rate over a long transmission distance. Under the control of a transmission controller, a separating circuit divides a packet of a packet signal into six payloads to make six transmission frames and adds a start delimiter and an end delimiter to the first and last transmission frames, and four transmitters send out the six transmission frames in accordance with sequence numbers at a rate at which the signal can be transmitted by way of time division transmission lines. Under the control of a reception controller, four receivers receive the transmission frames, and a restoring circuit assembles the transmission frames back into the original packet signal in accordance with the sequence numbers and the delimiter information.

In spite of the numerous existing or published patents, there remains a need for a system that can reliably, economically and efficiently take a data packet from a larger bandwidth network and compress it to a size such that it can be transmitted on a first channel of a narrower bandwidth payload network; and, where necessary, supplement the bandwidth capacity of the first channel of the narrower bandwidth payload network by providing, on demand, access to payload capacity of a second channel of the narrower bandwidth payload network.

SUMMARY OF THE INVENTION

Accordingly, one of the advantages of the present invention is that it can efficiently communicate a data packet for a larger bandwidth network across a smaller bandwidth network. In a particular embodiment it is therefore desirable to convert the data packet of the larger bandwidth network to a format of the smaller bandwidth network packet rather than encapsulate.

It is therefore an object of the present invention to provide an apparatus and method for converting a first conventional data packet received from a first broadband network to a second conventional data packet suitable for transmitting on a second broadband network, wherein a bandwidth of the second broadband network is less than a bandwidth of the first broadband network.

It is a further object of the present invention to provide the apparatus and method for converting the conventional data packet received from the first broadband network to the conventional data packet suitable for transmitting on the narrower bandwidth second broadband network, with no loss of data content.

It is a further object of a specific embodiment of the present invention to provide the apparatus and method for converting a conventional data packet received from a 1 Gb Ethernet network to a conventional data packet suitable for transmitting on a conventional standard bandwidth SONET such as an OCnc (n=1, 3, 12) payload network with no loss of data content.

A method accomplishing the foregoing objectives includes: receiving a series of data packet bursts from a broadband network with idle bytes interposed between the bursts; removing the idle bytes to produce a more constant bit stream; framing the packets in accordance with a conventional protocol such as a General Frame Protocol (GFP) or Packet Over Sonet (POS) protocol; and providing the framed data packets to said payload network.

In Applicant's related application entitled Method and Apparatus for Converting Data Packets between a Higher Bandwidth Network and a Lower Bandwidth Network, an embodiment of a method and apparatus directed to a payload network having only a single channel is described. In the instant application, embodiments of a method and apparatus directed to a payload network having a plurality of parallel channels is described.

More particularly, in the embodiments of the instant application a method and apparatus directed to a payload network having at least two parallel channels is described. The payload network of the instant application has a first, high priority, dedicated channel allocated to transmission of the data packets from the 1 Gb Ethernet network; and at least one second, lower priority, non-dedicated channel whose payload capacity is reassigned to transmission of the data packets from the 1 Gb Ethernet network on an as-needed basis. Specifically, the non-dedicated lower priority channel's capacity is normally made available for transmission of any low-priority data requiring bandwidth capacity. However, in the event that the capacity of the primary high priority channel is at any time exhausted, capacity on the lower priority channel is diverted from serving the low priority data and made available to the high priority data of the 1 Gb Ethernet network; the low priority data then currently utilizing the lower priority channel being subject to delay and/or data loss.

It is an object of a specific embodiment of the present invention to provide the apparatus and method for converting the conventional series of bursty data packets received from a 1 Gb Ethernet network, to the conventional data packets suitable for retransmitting on an OC12 payload network. However, in order to successfully effectuate this conversion a large number of bytes (1 Gb minus 622 Mb) needs to be removed from the 1 Gb Ethernet packet so that a size of the Ethernet packet can fit the OC12 bandwidth. Advantageously, a data content of the 1 Gb Ethernet stream is typically less than about 600 Mb, the remainder being idle bytes. Thus, removal of the idle bytes from the 1 Gb Ethernet stream can permit the Ethernet packet size to fit the OC12 bandwidth without any loss of data content.

Moreover, it is an object of the present invention to take advantage of the conventionally known bursty characteristic of Ethernet traffic, conventionally known to not be very delay sensitive, and to supply a SONET link with a bandwidth corresponding to an average valid data bandwidth of the Ethernet traffic, and therein to absorb the traffic bursts using a large buffer.

At a terminal end of the OC12 SONET/WAN the OC12 data packet can be restored to a format compatible with the 1 Gb Ethernet network.

It is a further object of the present invention to provide the apparatus and method for converting a series of conventional data packets received from the 1 Gb Ethernet network to a series of conventional data packets suitable for selectively transmitting on one or another of a pair of channels of a multi-channel OC12 payload network with no loss of data content. More particularly, it is an object of the present invention to provide the method and apparatus for converting a series of conventional data packets received from the 1 Gb Ethernet network to a series of conventional data packets suitable for transmitting on a dedicated high priority primary channel of an OC12 payload network, while a secondary, lower priority channel of the OC12 payload network is made available for transmitting lower priority data packets; and, on demand, in the event capacity at any time becomes unavailable or exhausted on the dedicated primary channel, to divert capacity on the secondary channel from the low priority data to the high priority data without loss of any high-priority data with the low priority data then currently utilizing the lower priority channel being subject to delay and/or data loss.

It is yet a further object of the present invention to provide the apparatus and method for converting the series of conventional data packets received from one or another of the pair of channels of the multi-channel OC12 payload network, to a series of conventional data packet suitable for re-transmitting on the 1 Gb Ethernet network.

These and other objects, features, and advantages of the invention will be better understood by those skilled in the art by reference to the following detailed description taken together with the following drawings in which like numerals identify like components throughout the several views.

DETAILED DESCRIPTION OF THE PREFERRED EMBODIMENT

Figure 1:
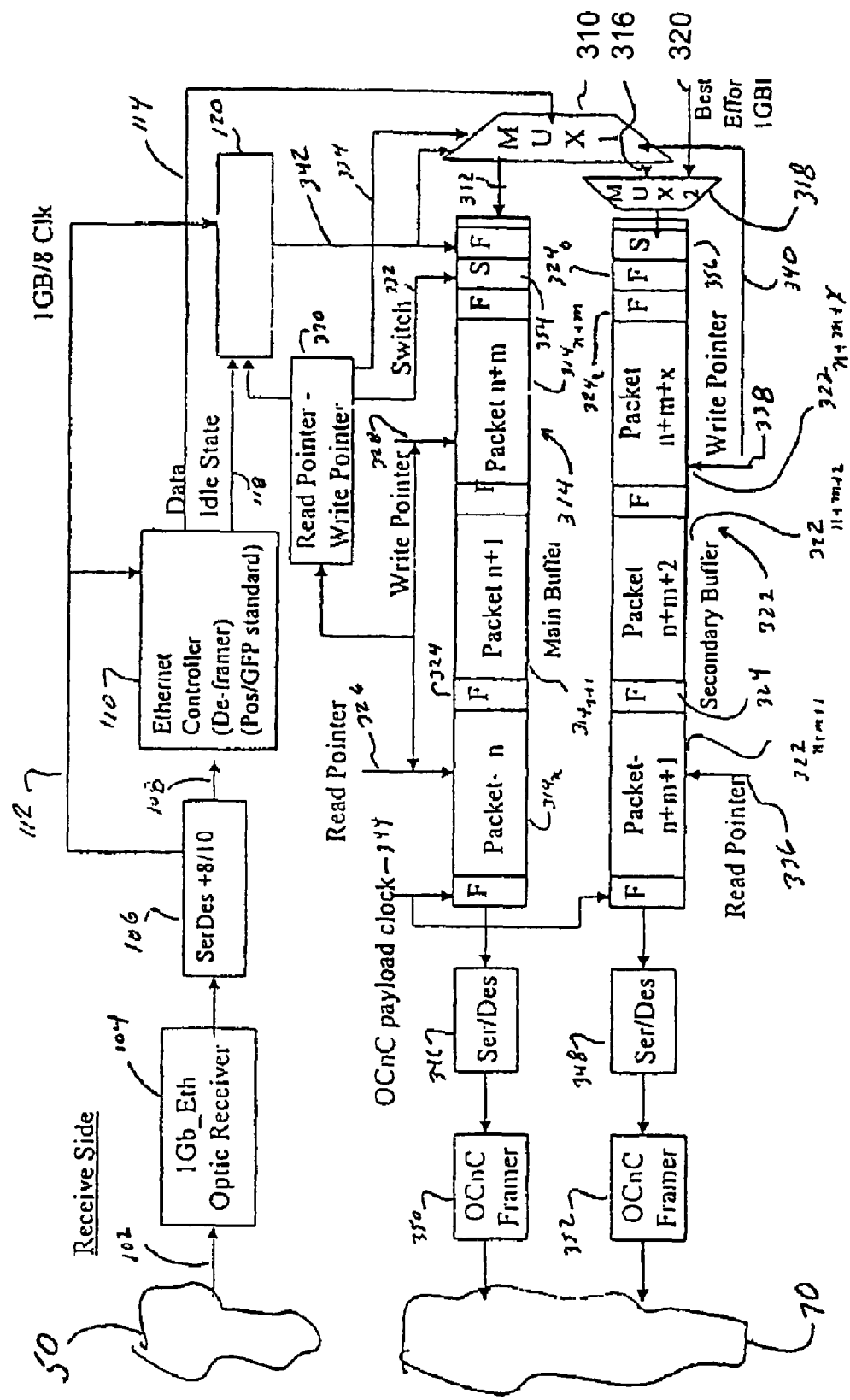
FIG. 1 is a schematic block diagram of an apparatus according to one embodiment of the present invention that can convert, format and demultiplex a 1 Gb Ethernet data packet for transmission on a multi-channel OC12 payload.

With reference to the figures in which like numerals represent like elements or components throughout the several views, and in particular with reference to FIG. 1, there is shown a schematic block diagram of an embodiment of an apparatus according to the present invention. The apparatus is for converting a bursty sequence of conventional 1 Gb Ethernet data packets (not shown) of an origin 1 Gb Ethernet network, schematically shown at 50, to conventional OC12 data packets (not shown) of each of two channels of a multi-channel OC12 payload network schematically shown at 70.

An Ethernet optical fiber 102 is connected at one end to Ethernet network 50. Another end of Ethernet optical fiber 102 is connected to an input of a conventional 1 Gb Ethernet optical receiver 104. An output of optical receiver 104 is connected to an input of a conventional serializer-deserializer 106. A first output of serializer-deserializer 106 is connected by a link 108 to an input of a conventional Ethernet Controller or Deframer 110. A second output of serializer-deserializer 106 is connected to a link 112 which is connected to a second input of Ethernet Controller 110. A data output of Ethernet Controller 110 is connected by a link 114 to an input port of a demultiplexer 310. A second output of Ethernet Controller 110 is connected by a link 118 to a first input of a control logic block 120.

A first output 312 of Demultiplexer 310 is connected to a main input buffer 314 and a second output 316 is connected to a first input of multiplexer 318. A second input 320 to multiplexer 318 is connected to a secondary, lower priority traffic source (not shown). An output of multiplexer 318 is connected to a secondary input buffer 322.

Each of input buffers 314 and 322 has a plurality of buffer sections which are each shown as sequentially, individually numbered sections and which are similarly shown as jointly sequentially numbered. Buffer 314 is shown starting with an "n"-th section shown at $314_n$, followed by an "n+1"-th section shown at $314_{n+1}$, and followed by additional sequentially numbered sections (not shown), ultimately ending in an "n+m"-th section shown at $314_{n+m}$. The sections of buffer 322 are similarly sequentially numbered and are numbered to follow in sequence the sections of buffer 314. Thus, a first section of buffer 322 is, in the joint numbering sequence, an "n+m+1"-th section such as shown at $322_{n+m+1}$, followed by an "n+m+2"-th section shown at $322_{n+m+2}$, and followed by additional sequentially numbered sections (not shown), ultimately ending in an "n+m+x"-th section shown at $322_{n+m+x}$; where n, m and x can be arbitrary non-negative numbers. The buffer sections are not fixed, but are virtual. Sections $314_n, 314_{n+1}, \ldots, 314_{n+m}$; and sections $322_{n+m+1}, 322_{n+m+2}, \ldots, 322_{n+m+x}$ of buffers 314 and 322, respectively, can be logically separated by a flag, such as flag 324; or a plurality of flags such as flags $324_a$, $324_b$.

Buffer 314 has a read pointer 326 and a write pointer 328 connected to an input of a conventional arithmetic difference register 330. A first output of register 330 is connected to a second input of control logic block 120. A second output of register 330 is connected by a link 332 to an input end of input buffer 314. A third output of register 330 is connected by a link 334 to demultiplexer 310.

Buffer 322 similarly has a read pointer 336 and a write pointer 338. Write pointer 338 is connected by a link 340 to demultiplexer 310.

An output of control logic block 120 is connected by a link 342 to both an input end of input buffer 314 and to demultiplexer 310. An OCnc payload clock 344 is connected to output ends of each of input buffers 314 and 322. In the specific embodiment of FIG. 1, OCnc payload clock 344 is an OC12 payload clock. An output of input buffer 314 is connected to an input of a conventional serializer-deserializer 346; and an output of input buffer 322 is connected to a conventional serializer-deserializer 348.

An output of serializer-deserializer 346 is connected to an input of a conventional OCnc framer 350; and an output of serializer-deserializer 348 is connected to an input of a conventional OCnc framer 352. Respective outputs of OCnc framers 350 and 352 are connected to corresponding channels of multi-channel OCnc payload network 70. In the specific embodiment of FIG. 1, OCnc framers 346 and 348 are OC12 framers, and OCnc payload network 70 is an OC12 payload network.

A 1 GB Ethernet data packet (not shown) is transmitted on 1 GB Ethernet network 50 along optical fiber 102 and is received by optical receiver 104. Optical receiver 104 receives the 1 GB Ethernet data packet and provides the packet to Serializer-deserializer 106. Serializer-deserializer 106 converts all of the bytes in the Ethernet data packet to a corresponding serial data stream (not shown) in a conventional manner as is known in the art. U.S. Pat. No. 4,486,739 to Franaszek et al., incorporated herein in its entirety by reference, discloses a method and apparatus for converting a conventional 8-bit parallel data byte into 10 binary digits; and U.S. Pat. No. 3,334,181 to Bartlett et al. and U.S. Pat. No. 4,398,225 to Cornaby et al., incorporated herein in their entirety by reference, disclose an apparatus and method for parallel to serial conversion, and serial to parallel conversion, respectively. Thus, the serial data stream comprises a sequential arrangement of data bytes in a one-to-one correspondence with the parallel bytes in the Ethernet data packet.

Serializer-deserializer 106 communicates the bytes in the serial data stream by link 108 to Ethernet Controller 110. Link 108 can be a conventional fiber optic cable, but can also be a conventional wire connector. Serializer-deserializer 106 also provides a first clock signal to link 112 during a time duration of the serial data stream. The first clock signal corresponds to a timing of Ethernet network 50; and is strobed in synchronization with a timing of the serial data stream outputted by serializer-deserializer 106. The first clock signal has a logical "high" value when a byte is transmitted in the serial data stream; and is strobed to a logical "low" value during an inter-byte time slice between successive bytes.

Ethernet Controller 110 sequentially receives each byte in the serial data stream from link 108 and outputs each received byte via serial data link 114 to an input of demultiplexer 310 in a same order as received.

Ethernet Controller 110 receives the first clock signal from link 112. During each logical "high" value strobe of the first clock signal, Ethernet Controller 110 receives a "next in sequence" byte from the serial data stream from link 108 corresponding to a next byte in the Ethernet data packet. The "next in sequence" byte thus becoming a "current" byte. Ethernet Controller 110 determines if the "current" byte is a non-idle byte, i.e., that it is part of a serial data stream corresponding to a burst Ethernet data packet; or if the "current" byte is an idle byte, i.e., it is part of an inter-packet space between successive packet bursts. Ethernet Controller 110 outputs a binary valued logical idle state signal on link 118 based on this determination.

Control logic block 120 combines the idle state signal on link 118 with a binary output from register 330 and the first clock signal from link 112 and provides, via link 342, write enable/disable output signals to input buffer 314 and demultiplexer 310. The write enable/disable signals from control logic block 120 follow the first clock signal on link 112.

Register 330 is a conventional arithmetic difference unit which determines a difference in a numeric value of read pointer 326 and write pointer 328 located at different sections of main input buffer 314. Read pointer 326 designates a location where the serial data stream corresponding to an "n"-th Ethernet data packet was previously serially stored in main input buffer 314, and which is next in sequence to be serially read out from main input buffer 314. Write pointer 328 designates a location in main input buffer 314 where the serial data stream corresponding to an "n+m"-th Ethernet data packet is next to be written into main input buffer 314.

Register 330 provides a binary valued logical output to control logic block 120 depending on the arithmetic difference between the value of read pointer 326 and the value of write pointer 328. If the arithmetic difference indicates that space is available in main input buffer 314 in which additional data can be written, register 330 outputs a first binary value to control logic block 120. If the arithmetic difference indicates that no space is available in main input buffer 316 into which additional data can be written, then a second binary value is provided to control logic block 120.

Register 330 determines, based on the difference between read pointer 326 and write pointer 328, whether main input buffer 314 is full, i.e., whether main input buffer 314 has met its load threshold. When "M" serial data streams, corresponding to "M" data packets, are stored in main input buffer 314, the load threshold of main input buffer 314 is met. When a load threshold of main input buffer 314 has been met (i.e., main input buffer 314 is at or approaching a full or overflow state) register 330 outputs to control logic block 120 a logical signal indicating that no further space is available in main buffer 314. Control logic block combines the signal from register 330 with the first clock signal on link 112 and the idle state signal on link 118 and provides a write enable/disable signal onto link 342 as previously described.

Control logic block 120 follows the first clock signal from link 112 and outputs a write-enable gate keeping signal onto link 342 when the first clock signal strobes to a logical "high" value and the idle state signal from link 118 indicates that the "current" byte on link 114 is not idle and the binary output from register 330 indicates that space is available in main input buffer 314 in which to write additional data. During an inter-byte time slice between successive bytes in the serial data stream when the first clock signal is at a logical "low" value, control logic block 120 outputs a write-disable gate keeping signal on link 342 that indicates to main input buffer 314 that no data is to be written, and indicates to demultiplexer 310 that no data is to be outputted.

Control logic block 120 similarly outputs onto link 342 a write disable signal when the idle state signal received from link 118 indicates that the "current" byte is idle. The write disable signal signals main input buffer 314 to not accept any data to be written into buffer 314. Similarly, the write disable signal signals to demultiplexer 310 to not output any of the idle byte data from link 114 to either of outputs 312 and 316.

Demultiplexer 310 outputs the serial data stream received from Ethernet controller 110 via link 114 to either its first output 312 for writing into main input buffer 314, or its second output 316 for writing into secondary input buffer 322 when the write enable/disable signal from control logic block 120 is in a write-enable state. When the write enable/disable signal from control logic block 120 is in a write-disable state, demultiplexer 310 does not write the serial data stream received from Ethernet controller 110. Thus, control logic block 120 suppresses writing of idle bytes by outputting a write-disable signal onto link 342.

Register 330 also outputs onto link 332 a logical switch flag signal 354 to main input buffer 314 when the arithmetic difference between read pointer 326 and write pointer 328 indicates that main input buffer 314 is approaching or has reached its load threshold. The switch flag signal 354 is appended after any place keeping flags, such as flag 324, which follow after the packet or frame boundary of the serial data stream corresponding to the "n+m"-th data packet currently being written into main buffer 314.

Register 330 also outputs onto link 334 a similar switch signal to demultiplexer 310. When demultiplexer 310 receives the switch signal, at the packet or frame boundary next following the "n+m"-th packet then currently being written into main input buffer 314, demultiplexer 310 ceases outputting further bytes in the received serial data stream to its first output 312, and instead thereafter outputs further bytes in the received serial data stream to its second output 316.

The serial data stream provided by Ethernet controller 110 corresponding to each received 1 Gb Ethernet data packet, excluding idle bytes, is routed to either main input buffer 314 or secondary input buffer 322 by demultiplexer 310 and therein written sequentially into respective buffer 314 or 322.

By default demultiplexer 310 normally outputs the serial data stream received from Ethernet controller 110 to its first output 312. When demultiplexer 310 receives via link 334 the switch signal outputted from register 330, demultiplexer 310 completes writing the serial data stream corresponding to the then current 1 Gb Ethernet data packet, and thereafter switches its outputting from first output 312 to second output 316 for any subsequently received serial data streams.

Second output 316 outputs the serial data stream corresponding to a next in sequence 1 Gb Ethernet data packet to a high-priority input of multiplexer 318. A low priority or "best-effort" input 320 of multiplexer 318 can be connected to another data source having a lower priority access to available transmission capacity on the OCnc payload network 70.

By default multiplexer 318 normally has no data stream provided to its high priority input. Thus, multiplexer 318 normally outputs to secondary input buffer 322 data received from the low priority data stream that is inputted to low priority input 320. However, when demultiplexer 310 switches its outputting from first output 312 to second output 316, multiplexer 320 detects the presence of an input signal at its high priority input and thereafter halts outputting to secondary input buffer 322 the low priority data stream received from low priority input 320 and, instead, following the next packet or frame boundary commences outputting the data stream received from the high priority input connected to second output 316 of demultiplexer 310. Multiplexing and demultiplexing is performed in packets units—that is, switching from one data source to another data source is performed at packets boundaries of the 1 Gb Ethernet packet. When the serial data stream from second output 316 of demultiplexer 310 is provided to the high priority input of multiplexer 318, multiplexer 318 switches outputting from its low priority input 320 to its high priority input at a next following packet or frame boundary of the low priority data stream. When multiplexer 318 switches from its low priority input 320 to its high priority input, multiplexer 318 appends a switch flag 356 following any place keeping flags, such as flags 324a and 324b, following the serial data stream stored in secondary input buffer 322. Switch flag 356 indicates that data transmission in the secondary channel of the OCnc payload network is at this point halted as to the data stream received from low priority input 320, and that access to available bandwidth capacity on the secondary channel has been switched to the serial data stream provided to the high priority input of multiplexer 318 connected to second output 316 of demultiplexer 310. When demultiplexer 310 shifts its outputting from first output 312 to second output 316, multiplexer 318 suspends outputting any data then currently being provided to low priority or "best-effort" input 320, the low priority data being then subject to delay or data loss. Any incomplete packet which was then being written into secondary buffer 322 will be discarded at a receiving end of the OC12 network.

Secondary input buffer 322 provides a feedback signal from its write pointer 338 by a link 340 to demultiplexer 310. If a capacity of secondary input buffer 322 is exhausted the feedback signal of write pointer 338 causes demultiplexer 310 to suspend writing further bytes in the serial data stream to second output 316 until buffer 322 can clear.

When the arithmetic difference between read pointer 326 and write pointer 328 of main input buffer 314 indicates that main input buffer 314 again has capacity, register 330 outputs onto link 332 a logical switch signal to main input buffer 314 that further data can again be written. Similarly, register 330 outputs onto link 334 a logical switch signal to demultiplexer 310 that data can again be written to main input buffer 314. At a packet or frame boundary following an "n+m+x"-th packet then currently being written into secondary input buffer 322, demultiplexer 310 again appends a switch flag 356 to the serial data stream stored in secondary input buffer 322 that indicates that high-priority transmission is at this point switched back to the main channel. Demultiplexer 310 simultaneously switches its outputting from second output 316 back to first output 312.

When demultiplexer 310 terminates outputting the serial data stream to second output 316, multiplexer 318 detects the termination of the serial data stream at its high priority input and thereafter resumes outputting to secondary input buffer 322 any best effort, low priority serial data stream input to multiplexer 318 via input 320.

Input buffers 314 and 322 are conventional shift-register type buffers. A "k"-th data packet can be written into an input end of one of buffers 314 and 322 while a "j"-th data packet can be simultaneously read out of an output end of the respective buffers 314 and 322. Initially an "n"-th data packet can be written into section $314_n$ of main input buffer 314. An "n+1"-th data packet can be written into section $314_{n+1}$, and successive data packets can be written into successive sections until the "n+m"-th data packet is written into section $314_{n+m}$. After data is read from section $314_n$ the data in section $314_{n+1}$ is shifted to section $314_n$, and the data in each successive section is likewise shifted down to the immediately preceding section. Secondary input buffer 322 performs read and write functions in a similar manner.

Read pointer 326 corresponds to section "j" which is currently being read. Write pointer "k" corresponds to section "k" which is currently being written. As long as a reading rate from buffer 314 is not less than a writing rate to buffer 314 the arithmetic difference between read pointer 326 and write pointer 328 computed by register 330 will remain less than the load threshold of buffer 314. Intermittent variations in the difference between the reading rate and writing rates can be accommodated by using a large buffer so long as an average reading rate is not less than an average writing rate. During time periods when the reading rate is less than the writing rate, arithmetic difference unit 330 provides switching signals to buffer 314 and demultiplexer 310 via links 332 and 334, respectively, as previously described.

A signal from a payload clock 344 of multi-channel OCnc payload network 70 is provided to output ends of main and secondary input buffers 314 and 322 to trigger the writing of corresponding serial data streams from primary and secondary input buffers 314 and 322 to corresponding ones of serializer-deserializer 346 and 348, respectively.

Serializer-deserializer 346 and 348 are each conventional circuits that receive the serial data stream outputted from corresponding buffers 314 and 322, respectively, comprising the non-idle bytes, place keeping flags 324 and switch flags 354 and 356. Each of serializer-deserializer 346 and 348 reconverts each byte in the corresponding received serial data stream, together with the place keeping flags and switch flags, to a corresponding parallel data (not shown) in a conventional manner as is known in the art. Thus, serializer-deserializer 346 provides a series of parallel data comprising a plurality of data bytes, place keeping flags, and switch flags arranged in correspondence with the sequence of data bytes in each of the "n"-th through "n+m"-th serial data streams stored in main input buffer 314. Serializer-deserializer similarly 348 provides a series of parallel data comprising a plurality of data bytes, place keeping flags, and switch flags arranged in correspondence with the sequence of data bytes in the "n+m+1"-th through "n+m+x"-th serial data streams stored in secondary input buffer 322. Thus, the parallel data provided by each of serializer-deserializer 346 and 348 correspond to the parallel data in the 1 Gb Ethernet data packet received by 1 Gb Ethernet receiver 104 but with the idle bytes omitted.

Serializer-deserializer 346 outputs its parallel data to an input of OCnc framer 350 which frames the parallel data in accordance with a selected protocol of OCnc payload network 70, such as by adding applicable header and routing information, thereby providing the conventional data packet (not shown) for a first channel of multi-channel OCnc payload network 70. The OCnc data packet from OCnc framer 350 is provided to the first channel (not shown) of multi-channel OCnc payload network 70 to be transmitted. Similarly, Serializer-deserializer 348 outputs its parallel data to an input of OCnc framer 352 which frames the parallel data in accordance with the selected protocol of OCnc payload network 70, thereby providing the conventional data packet (not shown) for a second channel of multi-channel OCnc payload network 70. The OCnc data packet from OCnc framer 352 is provided to the second channel (not shown) of multi-channel OCnc payload network 70 to be transmitted.

Although FIG. 1 depicts only two buffers and two channels for the OCnc payload network, it would be obvious to persons skilled in the art that more than two buffers and two channels can be utilized.

Figure 2:
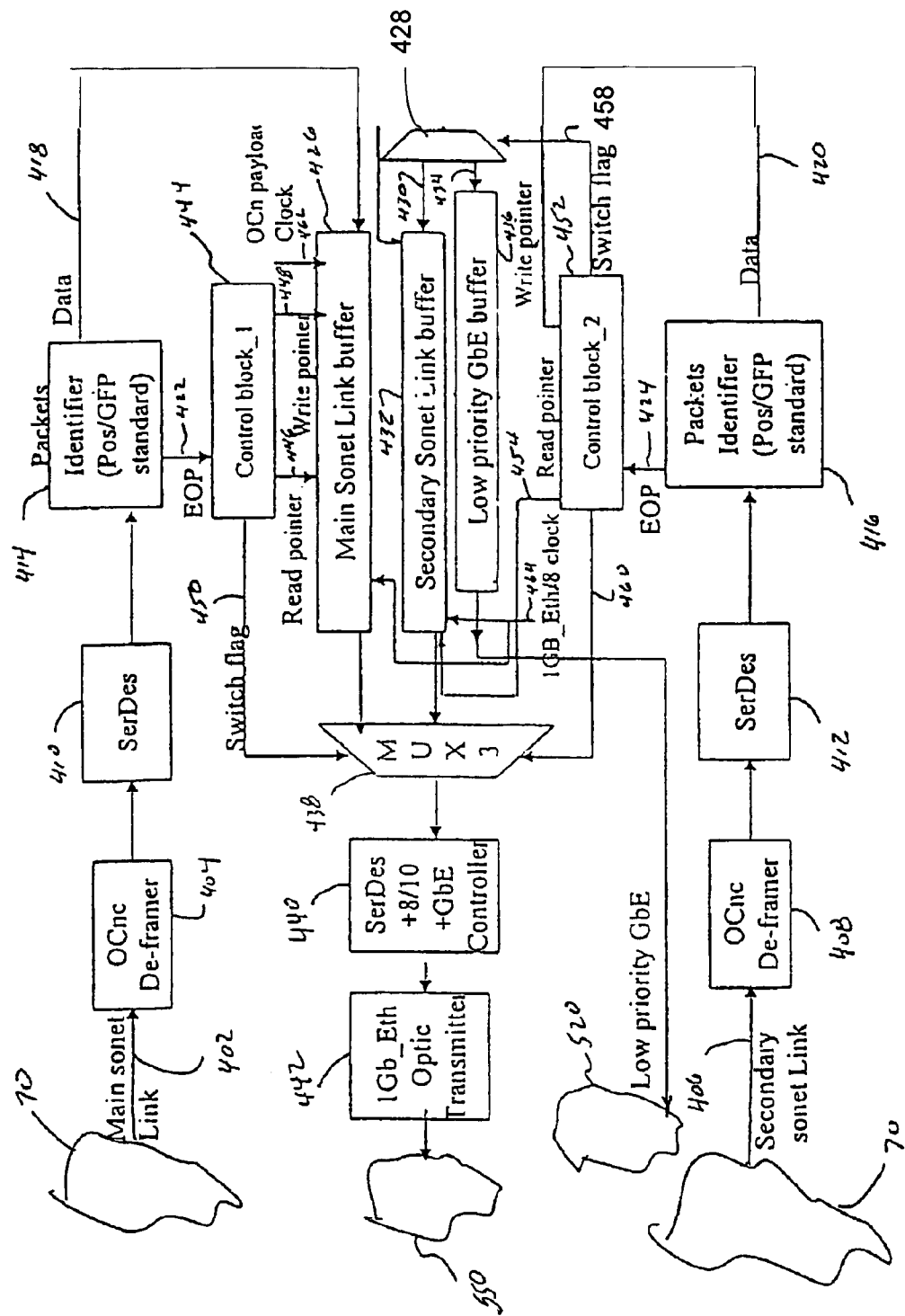
FIG. 2 is a schematic block diagram of an apparatus according to a specific embodiment of the present invention that can reconvert, reformat and remultiplex the data packets transmitted on the multi-channel OC12 payload network of FIG. 1 back to a 1 Gb Ethernet packet.

Referring now to FIG. 2, there is shown a schematic block diagram of an embodiment of an apparatus according to the present invention for converting data packets of the multi-channel OCnc payload network of FIG. 1 back to the format of the data packet for the 1 Gb Ethernet network.

A first channel 402 of multi-channel OCnc payload network 70 is connected to an input of a first conventional OCnc deframer 404. A second channel 406 of multi-channel OCnc payload network 70 is connected to an input of a second conventional OCnc deframer 408.

A respective output from each of deframers 404 and 408 is connected to an input of corresponding first and second conventional serializer-deserializer 410 and 412, whose respective outputs are connected to corresponding inputs of first and second conventional packets identifiers 414 and 416. First and second packets identifiers 414 and 416 are conventional packets identifiers having a selected transmission protocol of OCnc network 70 such as a General Frame Protocol (GFP) or a Packet Over Sonet (POS) protocol.

A serial data output of first packets identifier 414 is connected to a first end of a serial data link 418; and a serial data output of second packets identifier 416 is connected to a first end of a serial data link 420. A second output of first packets identifier 414 is connected to a link 422; and a second output of second packets identifier 416 is connected to a link 424. A second end of serial data link 418 is connected to a serial input of a conventional memory buffer such as main SONET Link buffer 426. A second end of serial data link 420 is connected to an input of demultiplexer 428. A first, high priority output 430 of demultiplexer 428 is connected to a conventional memory buffer such as secondary SONET Link buffer 432. A second, low priority output 434 of demultiplexer 428 is connected to a conventional memory buffer such as Best Effort buffer 436.

Respective outputs of main SONET Link buffer 426 and secondary SONET Link buffer 432 are connected to corresponding inputs of multiplexer 438. An output of best effort buffer 436 is connected to a secondary, lower priority destination network 520.

An output of multiplexer 438 is connected to an input of conventional serializer-deserializer/Gb Ethernet controller 440. An output of serializer-deserializer/Gb Ethernet controller 440 is connected to an input of conventional 1 Gb Ethernet optical transmitter 442 whose output is connected to destination 1 Gb Ethernet network 550.

Link 422 is also connected to an input of a first control block 444. First control block 444 is also connected to a read pointer 446 of main SONET link buffer 426, and to a write pointer 448 of main SONET link buffer 426. An output of control block 444 is connected by a link 450 to an input of multiplexer 438.

Link 424 is similarly connected to an input of a second control block 452. Second control block 452 is also connected to a read pointer 454 of secondary SONET link buffer 432, and to a write pointer 456 of secondary SONET link buffer 432. A first output of second control block 452 is connected by a link 458 to an input of demultiplexer 428; and a second output of second control block 452 is connected by a link 460 to an input of multiplexer 438.

An OCnc payload clock 462 is connected to respective input ends of each of main SONET link buffer 426, secondary SONET link buffer 432, and Best Effort buffer 436. A 1 Gb Ethernet network clock 464 is connected to respective output ends of each of main and secondary sonnet link buffers 426 and 432.

As described with respect to FIG. 1, a series of OCnc data packets (not shown) are transmitted via first channel 402 of multi-channel OCnc payload network 70 and are received by conventional OCnc deframer 404. Deframer 404 removes from each packet any header and routing information which was added by framer 350, shown in FIG. 1, and thereby provides parallel data which replicates the parallel data outputted from serializer-deserializer 346, also shown in FIG. 1. OCnc deframer 404 outputs the parallel data from each packet to serializer-deserializer 410.

Serializer-deserializer 410 converts the parallel data in each received OCnc packet to a corresponding serial data stream (not shown) in a conventional manner as is known in the art. Thus, the serial data stream outputted from serializer-deserializer 410 comprises a plurality of data bytes, place keeping flags, and switch flags arranged sequentially in correspondence with the data bytes, place keeping flags, and switch flags in the serial data stream outputted from main buffer 314 of FIG. 1. Serializer-deserializer 410 provides the serial data stream to packets identifiers 414.

Packets identifier 414 receives the serial data stream from serializer-deserializer 410 and outputs to link 418 each received data byte in the serial data stream in a same order as received. Packets identifiers 414 outputs to control block 444 via link 422 a logical end-of-packet signal at a logical end of a serial data stream corresponding to an end of an OCnc data packet. Packets identifier 414 also outputs to control block 444 via link 422 any place keeping flags, such as flag 324 shown in FIG. 1, and any switch flags, such as flag 354 also shown in FIG. 1.

Control block 444 controls read and write operations of main SONET link buffer 426. Control block 444 receives a value of read pointer 446 of main SONET link buffer 426; and receives a value of write pointer 448 of main SONET link buffer 426. If a difference between the value of read pointer 446 and the value of write pointer 448 indicates that no space is available in main SONET link buffer 426, control block 444 can return a conventional pause command to packets identifier 414.

The serial data stream outputted from packets identifier 414 to link 418, corresponding to the data bytes in a respective received OCnc data packet, are written sequentially into main SONET link buffer 426 in synchronization with a signal from the OCnc payload clock 462. Main SONET link buffer 426, in synchronization with a signal from 1 Gb Ethernet clock 464 sequentially outputs the respective serial data stream to multiplexer 438 which, in turn, outputs the respective serial data stream to serializer/deserializer 440.

When packets identifier 414 detects a place keeping flag in the serial data stream received from serializer/deserializer 410, such as flag 324 shown in FIG. 1, packets identifier 414 outputs to control block 444 via link 422 an end of packet signal. Control block 444 receives the end of packet signal from packets identifier 414 and triggers multiplexer 438 to read the serial data stream from main Sonet link buffer 426.

Whenever packets identifier 414 identifies a switch flag in the serial data stream received from serializer/deserializer 410, such as flag 354 shown in FIG. 1, packets identifier 414 outputs to control block 444 via link 422 a switch command. Control block 444 receives the switch command from packets identifier 414 and signals multiplexer 438, via link 450, that a next-in-sequence transmitted data packet was switched to second channel 406. After completing the inputting of the current serial data stream corresponding to a current data packet from main SONET link buffer 426, multiplexer 438 switches its inputting to its second input connected to secondary SONET link buffer 432.

Similar to primary channel 402, OCnc data packets (not shown) are transmitted via second channel 406 of multi-channel OCnc payload network 70 and are received by conventional OCnc deframer 408. Deframer 408 removes from each packet any header and routing information which was added by framer 352, shown in FIG. 1, and thereby provides parallel data which replicates the parallel data outputted from serializer-deserializer 348, also shown in FIG. 1. OCnc deframer 408 outputs the parallel data from each packet to serializer-deserializer 412.

Serializer-deserializer 412 converts the parallel data in each received OCnc packet to a corresponding serial data stream (not shown) in a conventional manner as is known in the art. Thus, the serial data stream outputted from serializer-deserializer 412 comprises a plurality of data bytes, place keeping flags, and switch flags arranged sequentially in correspondence with the data bytes, place keeping flags, and switch flags in the serial data outputted from secondary buffer 322 of FIG. 1. Serializer-deserializer 412 provides the serial data stream to packets identifiers 416.

Packets identifier 416 receives the serial data stream from serializer-deserializer 412, discards any incomplete data packets, and outputs to link 420 each received data byte in the serial data stream, corresponding to complete data packets, in a same order as received. Packets identifiers 416 outputs to control block 452 via link 424 a logical end-of-packet signal at a logical end of a serial data stream corresponding to an end of an OCnc data packet. Packets identifier 416 also outputs to control block 452 via link 424 any place keeping flags, such as flags 324a and 324b shown in FIG. 1, and any switch flags, such as flag 356 also shown in FIG. 1.

Control block 452 controls read and write operations of secondary SONET link buffer 432. Control block 452 also controls switching operations of demultiplexer 428. Control block 452 receives a value of read pointer 454 of secondary SONET link buffer 432; and receives a value of write pointer 456 of secondary SONET link buffer 432. If a difference between the value of read pointer 454 and the value of write pointer 456 indicates that no space is available in secondary SONET link buffer 432, control block 452 can return a pause command to packets identifier 416.

The serial data stream outputted from packets identifier 416 to link 420, corresponding to the data bytes in a respective received OCnc data packet, are outputted by packets identifier 416 to link 420 and inputted therefrom by demultiplexer 428. By default data inputted by demultiplexer 428 from link 420 is outputted sequentially from demultiplexer 428 via second output 434 and written therefrom into best effort buffer 436 in synchronization with a signal from the OCnc payload clock 462. Data from best effort buffer 436 is, in turn, outputted to lower priority network 520.

When packets identifier 414 detects a switch flag 354 appended to the serial data stream from first channel 402, packets identifier 416 detects a corresponding switch flag 356 appended to the serial data stream from second channel 404. Packets identifier 416 provides the switch flag 356 from the serial data stream received from second channel 406 to control block 452. Control block 452 receives the switch flag 356 and, like control block 444, signals to multiplexer 438, via link 460, to switch its inputting function to its secondary input connected to the output of secondary SONET link buffer 432. Control block 452 simultaneously provides a switch signal to demultiplexer 428 via link 458 to switch its outputting from its default second output 434 to its high priority first output 430. Thereafter, serial data provided by packets identifier 416 to link 420 is written into demultiplexer 428 and, in turn, written to secondary SONET link buffer 432 in synchronization with the signal from the OCnc payload clock 462.

Secondary SONET link buffer 432, like main SONET link buffer 426, sequentially outputs the respective serial data stream to multiplexer 438 in synchronization with a signal from the 1 Gb Ethernet clock 464. Multiplexer 438, in turn, outputs the respective serial data stream to serializer-deserializer 440.

When packets identifier 416 detects a place keeping flag in the serial data stream received from serializer/deserializer 412, such as flag 324a shown in FIG. 1, packets identifier 416 outputs to control block 452 via link 424 an end of packet signal. Control block 452 receives the end of packet signal from packets identifier 416 and triggers multiplexer 438 to read the serial data stream from secondary Sonet link buffer 432.

Multiplexer 438 reads respective serial data streams from one or the other of main Sonet link buffer 426 and secondary Sonet link buffer 432 in synchronization with a signal from 1 Gb Ethernet clock 464. Multiplexer 438 selectively reads from one or the other of main Sonet link buffer 426 and secondary Sonet link buffer 432 in response to switch signals provided by control block 444 and control block 452 which indicate that sequentially transmitted data packets from at originating 1 Gb Ethernet network were switched and transmitted using multiple channels of the OCnc payload network.

Respective serial data streams read by multiplexer 438 from one or the other of main Sonet link buffer 426 and secondary Sonet link buffer 432 are outputted, in sequence, from multiplexer 438 to serializer-deserializer/Gb Ethernet controller 440. Serializer-deserializer/Gb Ethernet controller 440 detects the presence of any place keeping flags 324 that may be present in the respective transmitted serial data stream and substitutes, in lieu thereof, as many idle bytes (not shown) as are required to fill out a packet size for a destination 1 Gb Ethernet network thereby restoring the idle bytes removed by the circuit of FIG. 1. Serializer-deserializer/Gb Ethernet controller 440 then converts the serial data stream, together with the reinserted idle bytes, to a parallel data packet in a conventional manner as is known in the art thereby reconstructing the original 1 Gb Ethernet data packet received by the circuit of FIG. 1 from 1 Gb Ethernet network 50. Serializer-deserializer/Gb Ethernet controller 440 outputs the reconstructed 1 Gb Ethernet data packet to 1 Gb Ethernet optical transmitter which transits the 1 Gb Ethernet data packet to 1 Gb Ethernet network 550.

The present invention has now been described with respect to selected embodiments thereof. However, other embodiments would be obvious to those skilled in the art without departing from the spirit and scope of the appended claims.

I claim:

1. A method for converting a data stream comprising first data having a plurality of first data packets and idle bytes interposed therebetween received from a broadband network to another data stream, comprising second data having the plurality of second data packets for communication on a payload network having a narrower bandwidth than said broadband network, said payload network having two channels, method comprising receiving the first data from the broadband network;
converting said first data into a serial data-stream;
identifying idle bytes and non-idle bytes in said serial data-stream;
removing said idle bytes from said first data thereby providing a reduced data;
providing said reduced data to one or another of said two channels of said payload network as follows:

writing said non-idle bytes into a first buffer if space is available therein;

writing said non-idle bytes into a second buffer if space is not available in said first buffer;

writing a place keeping flag into said first and second buffers in substitution of an idle byte omitted from the data stream stored therein;

outputting said non-idle bytes from each of said first and second buffers; and converting said outputted non-idle bytes into respective said second data packets.

2. The method as claimed in claim 1 wherein said broadband network is a 1 Gb Ethernet network.

3. The method as claimed in claim 1 wherein said payload network is a SONET network.

4. The method as claimed in claim 3 wherein said SONET network is selected from the group consisting of (OC 1, OC3, and OC12).

5. The method as claimed in claim 1 wherein said first data packet is formatted in accordance with a protocol of said broadband network.

6. The method of claim 1 further comprising using a GFP or POS protocol.

7. The method of claim 1 further comprising outputting said place keeping flag from said buffer.

8. The method of claim 1 further comprising writing a switch flag into said first and second buffers whenever a first of two successive serial data streams is written into one of said two channels and a second of two successive data streams is written into another of said two channels.

9. The method as claimed in claim 1 wherein said step of identifying said idle bytes and said non-idle bytes is in response to a first clock signal, said first clock signal corresponding to a timing of said first data packets.

10. The method as claimed in claim 1 wherein said step of writing said non-idle bytes into said buffer is in response to a first clock signal, said first clock signal corresponding to a timing of said first data packets.

11. The method as claimed in claim 1 wherein said step of converting said outputted non-idle bytes to said second data packets is in response to a payload network clock signal.

12. The method as claimed in claim 1 further comprising deserializing said non-idle bytes outputted from said buffers.

13. The method as claimed in claim 1 further comprising formatting said second data packet in accordance with a protocol of said payload network.

14. A method for converting a first data packet and a second data packet from a format of a first broadband network to a format of a payload network for transmission thereon and thereafter converting back to a format of the first broadband network, comprising converting bytes of said first data packet to a first serial data stream;

identifying idle bytes and non-idle bytes in said first serial data stream:

sequentially writing said non-idle bytes of said first data stream into one of two buffers;

inserting a place keeping flag into said one of two buffers at a location corresponding to a location of an idle byte next following said non-idle byte;

converting bytes of said second data packet to a second serial data stream;

identifying idle bytes and non-idle bytes in said second serial data stream:

sequentially writing said non-idle bytes of said second serial data stream into another of two buffers;

inserting a place keeping flag into said another of two buffers at a location corresponding to a location of an idle byte next following said icon-idle byte;

inserting a switch flag into said one of two buffers:

serially outputting a contents of each of said two buffers;

converting said outputted contents to respective payload network packets;

converting said payload network packets to respective payload network serial data streams;

writing said payload network serial data streams to respective buffers;

identifying said place keeping flags in each of said payload network serial data streams;

replacing said place keeping flags with substitute idle bytes, thereby obtaining and resequencing said respective first and second serial data streams in relation to each other.

15. A communication system for converting data packets of a broadband network, comprising non-idle bytes and idle bytes together forming first data into data packets of a narrower bandwidth payload network, comprising non-idle bytes, the system comprising:

a receiver for receiving said first data;

an idle bytes identifier in communication with said receiver:

a demultiplexer connected to said idle bytes identifier;

two buffers connected to said demultiplexer;

a logic circuit connected to said idle bytes identifier and said two buffers for enabling and disabling writing of said first data into one or another of said two buffers, in response to a signal from said idle bytes identifier; and means for inserting a place keeping flag in one or another of said two buffers in substitution of said idle bytes when said logic circuit disables writing of said first data.

16. The communication system as claimed in claim 15 wherein said broadband network is a 1 Gb Ethernet network.

17. The communication system as claimed in claim 15 wherein said narrower bandwidth payload network is a SONET network.

18. The communications system as claimed in claim 17 wherein said SONET network is selected from the group consisting of OC1, OC3 and OC12.

19. The communications system as claimed in claim 15 further comprising a first converter for converting a data packet in a format of said broadband network to said first data.

20. The communications system as claimed in claim 15 wherein each of said two buffers further comprises a read pointer and a write pointer;

wherein said logic circuit is further controlled by said read pointer and said write pointer.

21. The communications system as claimed in claim 15 adapted for writing said first data into any of said two buffers at a rate corresponding to a clock rate of said broadband network.

22. The communications system as claimed in claim 15 adapted mr reading said non-idle bytes and said place keeping flags from any of said two buffers at a rate corresponding to a clock rate of said payload network.

23. The communications system as claimed in claim 15 further comprising a second converter for converting said non-idle bytes and said place keeping flags from any of said two buffers to a data packet in a format for said payload network.

24. A communication system for converting data packets from a format of a payload network to a format of a broadband network having a wider bandwidth than said payload network, comprising two channels for respectively carrying first and second data each of said first and second data having non-idle bytes and place keeping flags;

first and second buffers for buffering said first and second data, respectively;

a multiplexer connected to said first and second buffers;

means for replacing said place keeping flags by substitute idle bytes, and a logic circuit for switching an input of said multiplexer from a first of said two buffers to another of said two buffers in response to a switch flag appended to one of said first and second data.

25. The communication system as claimed in claim 24 wherein said broadband network is a 1 Gb Ethernet network.

26. The communication system as claimed in claim 24 wherein said payload network is a SONET network.

27. The communication system as claimed in claim 26 wherein said SONET network is selected from the group consisting of OC1, OC3, and OC12.

28. The communications system as claimed in claim 24, further comprising a first converter for converting a data packet in a format of said payload network to said first data.

29. The communications system as claimed in claim 24, further comprising a second converter for converting an output of Said buffer to a data packet in a format of said broadband network.

30. The communications system as claimed in claim 24, adapted for writing said first and second data into said first and second buffers at a rate corresponding to a clock rate of said payload network.

31. The communications system as claimed in claim 24, adapted for output from said first and second buffers said first and second data at a rate corresponding to a clock rate of said broadband network.

* * * * *